Dec. 1, 1964  M. W. HOTT, JR  3,159,177
PRESSURE REGULATOR VALVE CONSTRUCTION
Filed June 27, 1962

INVENTOR
Melville W. Hott, Jr.

BY Des Jardins, Robinson, Little & Shuck

ATTORNEYS

United States Patent Office 3,159,177
Patented Dec. 1, 1964

3,159,177
PRESSURE REGULATOR VALVE CONSTRUCTION
Melville W. Hott, Jr., Cincinnati, Ohio, assignor to Richards Industries, Inc., Cincinnati, Ohio, a corporation of Ohio
Filed June 27, 1962, Ser. No. 207,149
15 Claims. (Cl. 137—494)

This invention relates to fluid regulating means, and more particularly a fluid regulating valve having means automatically responsive to changes in actuating pressure to vary and control the rate of flow of fluid through the valve.

This is a continuation in part of my copending application Serial No. 159,954 filed December 18, 1961, now abandoned.

One of the purposes of this invention is to provide an improved valve construction of the above type. In particular, one embodiment of the valve construction of this invention comprises a valve housing having a pair of opposed ports formed therein and interconnected together. A fixed valve member is disposed in the housing between the ports thereof to prevent flow of fluid between the ports, the fixed valve member having one or more openings formed therein to interconnect the ports of the housing when the opening or openings are uncovered in a manner hereinafter described.

A fixed guide member is also disposed in the housing and has one side thereof disposed in abutting relation with one side of the fixed valve member, the guide member having an aperture passing therethrough and interconnected to the opening or openings in the fixed valve member.

The aperture in the guide member is so constructed and arranged that the same is adapted to receive a movable valve member which has one side thereof disposed in sliding engagement with the one side of the fixed valve member, the movable valve member being movable relative to the guide member between positions covering and uncovering the opening or openings in the fixed valve member whereby the movable valve member is adapted to control the amount of fluid or the like passing between the ports formed in the valve housing.

While any suitable means may be provided for moving the movable valve member between its opened and closed positions, one embodiment of this invention comprises a flexible diaphragm carried by the valve housing and having one side thereof subject to the pressure in one of the ports of the valve housing, the diaphragm being interconnected to the movable valve member by a movable rod carried by the housing. The diaphragm is normally held in one position thereof by a suitable biasing means carried by the housing whereby the movable valve member is moved to a position to close the opening or openings in the fixed valve member so that no fluid can flow between the ports of the valve housing. However, should conditions exist where it is required to interconnect the ports of the valve housing together because the pressure value of the fluid in the one port thereof has exceeded a predetermined pressure value, the diaphragm senses such increase in pressure value and moves the movable valve member to an opened position thereof whereby the ports of the valve member are interconnected together by the uncovered opening or openings in the fixed valve member.

In this manner the excess pressure value of the fluid in the one port can be expelled through the opening or openings in the fixed valve member to the other port of the valve construction whereby the movable valve member again closes the opening or openings in the fixed valve member when the diaphragm senses that the pressure value of the pressure fluid in the one port falls to or below the predetermined pressure value.

This type of valve requires precision machining in that the valve must be ground or otherwise treated from time to time to eliminate rust and other formations which occasionally accumulate thereby preventing proper seating of the valve in its seat. With this type of construction, if the movable member is disposed at the downstream side of the fixed orifice plate, difficulty is encountered in the proper regulation function of such a valve since high pressure fluid may tend to pass through the orifice portion of the fixed member and between the fixed member and the movable member because the fluid pressure tends to separate these two members. In order to avoid this type of problem, it has become customary to have the movable member disposed on the high pressure side of the fixed member so that the fluid pressure tends to force these two members together instead of apart.

When both the fixed and movable member are metallic in nature environmental conditions can exist which will cause a greater value of frictional force between said members than is desirable in a mechanism of this type. A further increase in magnitude will occur as the opposed surfaces of the said members wear and gall over an extended period of time.

This type of construction also requires precision machining and grinding of the fixed and movable members in order to minimize the frictional forces involved and resulting from the fluid pressure tending to force these two members together. In addition, even with precision machining and through the utility of carefully selected materials, the frictional forces are sufficiently high as to impose a serious problem and to require pressure responsive means capable of producing substantially high forces in order to overcome the frictional forces and thus effect movement of the movable member. This results in increased weight and cost. Further more, because of the high frictional forces involved, the operation of valves of this general type is often erratic; and valves employing this type of construction are often subjected to damage resulting from seizing and galling, particularly if fluid contains any foreign particles however small.

Accordingly, it is an object of this invention to provide an improved valve construction for obviating the aforementioned difficulties.

In another embodiment of this invention, the valve construction is adapted to interconnect the ports together when the diaphragm senses that the pressure value in one of the ports has fallen below a predetermined pressure for a purpose hereinafter described so that fluid under pressure from the other port can be conveyed to the one port to raise the pressure value thereof.

Thus, it can be seen that the valve construction of this invention can either prevent a source of pressure fluid from exceeding a predetermined value or from falling below a predetermined value.

Such valve constructions have a wide variety of uses and, one such use is to form part of pilot plants and the like wherein only the valve members of the valve constructions of this invention need be modified to adapt the valve construction to the particular pilot plant needs in a manner hereinafter described.

Another object of this invention is to provide an improved valve construction having novel guide means for guiding movement of a movable valve member.

Another object of this invention is to provide an improved valve construction having improved means for interconnecting the movable valve member thereof with means to move the movable valve member between its opened and closed positions.

A further object of the invention is to provide an improved valve construction that can be readily converted from a valve construction that prevents a source of fluid pressure from exceeding a predetermined pressure value to a valve construction that prevents a source of fluid pressure from falling below a predetermined pressure value.

Another object of the invention is to provide an improved valve construction having improved operating characteristics and, at the same time, is relatively inexpensive to manufacture.

A further object of the invention is to provide an improved valve construction of reduced weight and cost and, at the same time, is completely reliable in operation.

Still another object of the invention is in the provision of an improved valve construction wherein frictional forces are minimized to permit the use of actuating means of reduced size and force capability without sacrificing desired operating characteristics or reliability.

Other objects and advantages of the invention will be apparent from the following description which proceeds with reference to the accompanying drawings forming a part thereof and wherein.

While the various features of this invention are hereinafter illustrated and described as preferred embodiments, it is to be understood such embodiments are intended to be illustrative and not limiting except as defined in the appended claims.

Figure 1:
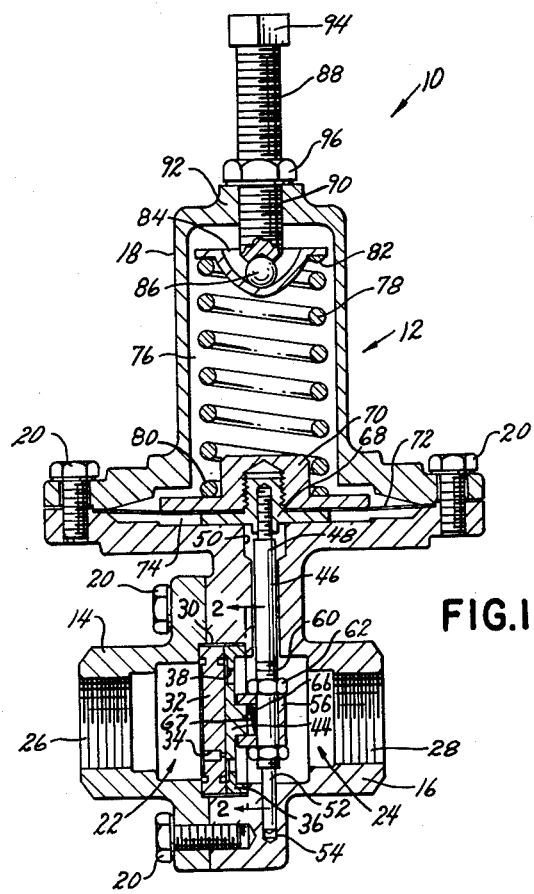
FIGURE 1 is an axial cross-sectional view of one embodiment of the valve construction of this invention.

Referring now to FIGURE 1, an improved valve construction of this invention is generally indicated by the reference numeral 10 and comprises a housing 12 formed from a plurality of valve members 14, 16, and 18 suitably interconnected together by bolts 20 or the like.

While the housing 12 is illustrated as being formed from a plurality of parts 14, 16 and 18, it is to be understood that the housing 12 could be formed from one or more parts as desired, the purpose being to readily facilitate assembly of the valve construction 10 in the manner hereinafter described.

The housing 12 has a pair of opposed ports 22 and 24 formed therein and interconnected together, the ports 22 and 24 being respectively adapted to be interconnected to suitable conduits and the like by the internal threads 26 and 28 thereof in a conventional manner.

The ports 22 and 24 are respectively defined in the housing members 14 and 16 and are interconnected together by a annular groove 30 formed respectively in the mating portions of the housing members 14 and 16.

A substantially circular, fixed valve member 32 is disposed in the annular groove 30 between the ports 22 and 24 to prevent fluid communication between the ports 22 and 24. However, the fixed valve member 32 has a plurality of openings 34 passing therethrough to interconnect the ports 22 and 24 in a manner hereinafter described. While two such openings 34 are illustrated in the drawings, it is to be understood that one or more openings 34 may be utilized, as desired.

A substantially circular, fixed guide member 36 is also disposed in the annular groove 30 with the fixed valve member 32 to hold the fixed valve member 32 in a fixed position in the housing 12 whereby one side of the guide member 36 is disposed in abutting relation with one side of the fixed valve member 32.

The fixed valve member 32 and fixed guide member 36 can be so constructed and arranged that the same carries suitable sealing means to effectively seal the same in the annular groove 30 between the housing members 14 and 16, as illustrated, in order to prevent fluid leakage between the ports 22 and 24.

Figure 2:
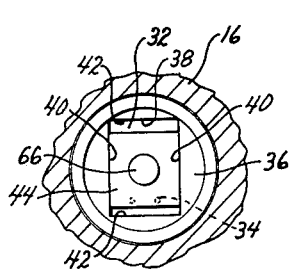
FIGURE 2 is a fragmentary cross-sectional view taken on line 2—2 of FIGURE 1.

As illustrated in FIGURES 1 and 2, the fixed guide member 36 has a substantially rectangular aperture 38 passing therethrough and interconnected with the openings 34 in the fixed valve member 32. The aperture 38 defines a pair of opposed side walls 40 and a pair of opposed end walls 42 of the guide member 36 for a purpose hereinafter described.

A substantially rectangular, movable valve member 44 is disposed in the aperture 38 of the fixed guide member 36 in such a manner that one side of the movable valve member 44 is disposed in sliding relation with one side of the fixed valve member 32, the movable valve member 44 being so constructed and arranged that the same is guided in its movement between the opposed end walls 42 of the guide member 36 by the opposed side walls 40 of the guide member 36.

The movable valve member 44 when moved toward the upper end wall 42 of the guide member 36, uncovers the openings 34 in the fixed valve member 32 to thereby interconnect the ports 22 and 24 of the valve construction 10. When the valve member 44 is moved toward the lower end wall 42 of the guide member 36, the movable valve member 44 closes off the openings 34 of the fixed valve member 32 whereby communication between the ports 22 and 24 of the valve construction 10 is prevented. Of course, it is to be understood that the valve member 44 could be in a position where only part of the openings 34 in the fixed valve member 32 are uncovered so that the valve member 44 can control the amount of communication between the ports 22 and 24 in a manner similar to a throttle valve.

While any suitable means can be utilized to move the movable valve member 44 between its opened and closed positions, one embodiment of this invention comprises a movable rod 46 having one end 48 thereof passing through an over-sized bore 50 in the upper portion of the housing member 16 and the other end 52 thereof being received in a bore 54 in the lower portion of the housing member 16 whereby the rod 46 is limited to only axial or vertical movement thereof.

Figure 3:
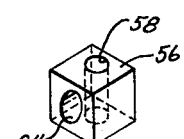
FIGURE 3 is a perspective view illustrating one of the elements of the valve construction of FIGURE 1.

A block 56, FIGURES 1 and 3, has a bore 58 passing vertically therethrough which is adapted to receive the medial portion of the rod 46 in the manner illustrated. Preferably, the medial portion of the rod 46 is threaded, as at 60, whereby suitable nuts 62 can be carried by the rod 46 on opposite sides of the block 56 and hold the rod 46 in a fixed position relative to the block 56.

The block 56 is provided with another bore 64 disposed transversely to the first bore 58 thereof and receives a projection 66 extending outwardly from the movable valve member 44 whereby the block 56 operatively interconnects the movable rod 46 to the movable valve member 44. If desired, a spring 67 is disposed in bore 64 between projection 66 and rod portion 60 to urge member 44 against member 32 although the use of spring 67 may not be necessary because the fluid pressure in port 24 will tend to accomplish this result.

In this manner, axial movement of the rod 46 upwardly in the drawings causes the valve member 44 to slide upwardly relative to the fixed valve member 32 to uncover the openings 34 in the fixed valve member 32 whereby the ports 22 and 24 are interconnected together. When the movable rod 46 is moved vertically downwardly, the movable valve member 44 is moved vertically downward therewith and covers the openings 34 in the fixed valve member 32 whereby communication between the ports 22 and 24 of the valve construction 10 is prevented.

The upper end 48 of the movable rod 46 is interconnected to a retaining member 68 which is, in turn, interconnected to a cup-shaped member 70, the members 68 and 70 carrying a flexible diaphragm 72 therebetween. The diaphragm 72 has the outer periphery thereof disposed between the housing members 16 and 18 whereby the flexible diaphragm 72 divides the housing member 18 into two chambers 74 and 76.

The chamber 74 is interconnected to the port 24 of the valve construction 10 by the over-sized bore 50 formed in the housing member 16.

The diaphragm 72 is normally held in the position illustrated in FIGURE 1, whereby the movable valve member 44 is disposed in its closed position, by a spring 78 having one end 80 thereof disposed against the cup-shaped retainer 70 and the other end 82 thereof disposed against a retainer 84, the retainer 84 abutting against a ball 86 which, in turn, abuts against a threaded member 88 passing through a threaded opening 90 formed in the end 92 of the valve housing 12.

In this manner, when the enlarged head 94 of the threaded member 88 is turned in a particular direction, the threaded member 88 is progressively moved inwardly into the compartment 76 of the valve housing 12 whereby the force of the compression spring 78 acting to move the flexible diaphragm 72 downwardly is increased. Conversely, when the threaded member 88 is rotated in the opposite direction to progressively move the threaded member 88 out of the chamber 76, the force of the compression spring 78 tending to move the flexible diaphragm 72 downwardly as illustrated in the drawings is reduced.

Thus, it can be seen that the threaded member 88 is adapted to adjust the force of the spring 78 acting to push the diaphragm 72 vertically downwardly to any predetermined force.

Once the desired force of the compression spring 78 has been reached by moving the threaded member 88 inwardly or outwardly, the threaded member 88 can be locked in its desired position by a nut 96 in a manner well known in the art.

Therefore, it can be seen that a relatively simple valve construction 10 has been provided by the teachings of this invention which is adapted to operate in the following manner.

The port 24 of the valve construction 10 is adapted to be interconnected to any suitable fluid pressure source while the port 22 thereof is adapted to be interconnected to another fluid pressure source having a pressure value lower than the pressure value of the fluid pressure source interconnected to the port 24. For example, the port 22 may be interconnected to atmosphere or to a suitable reservoir.

The force of the compression spring 78 is regulated by the movable member 88 in such a manner that the movable valve member 44 will uncover the openings 34 in the fixed valve member 32 when the pressure value of the fluid pressure interconnected to the port 24 exceeds a predetermined pressure value. In this manner, should the force of the pressure fluid in the port 24 exceed the predetermined pressure value, the force of the fluid in the port 24 acts against the flexible diaphragm 72 in opposition to the force of the spring means 78 whereby the diaphragm 72 is moved vertically upwardly causing the movable rod 46 to carry the movable valve member 44 upwardly therewith. When the movable valve member 44 uncovers the openings 34 in the fixed valve member 32, the fluid pressure in the port 24 is interconnected to the port 22 by the uncovered openings 34 whereby the pressure value of the pressure fluid in the port 24 can be reduced.

When the pressure value of the pressure fluid in the port 24 has fallen to or below the predetermined pressure value, the force of the compression spring 78 acting to move the diaphragm 72 downwardly moves the diaphragm 72 downwardly causing the movable rod 46 to move the movable valve member 44 downwardly to again cover the openings 34 in the fixed valve member 32.

In this manner, the valve construction 10 is adapted to prevent the pressure value of the pressure fluid interconnected to the port 24 thereof from exceeding a predetermined pressure value.

While the valve construction 10 illustrated in FIGURES 1-3 has been described as being adapted to prevent the pressure value of the pressure fluid interconnected to the port 24 thereof from exceeding a predetermined value, it is to be understood that the valve construction 10 could be modified in a manner to prevent the pressure value of the pressure fluid interconnected to the port 24 thereof from falling below a predetermined pressure value.

Figure 4:
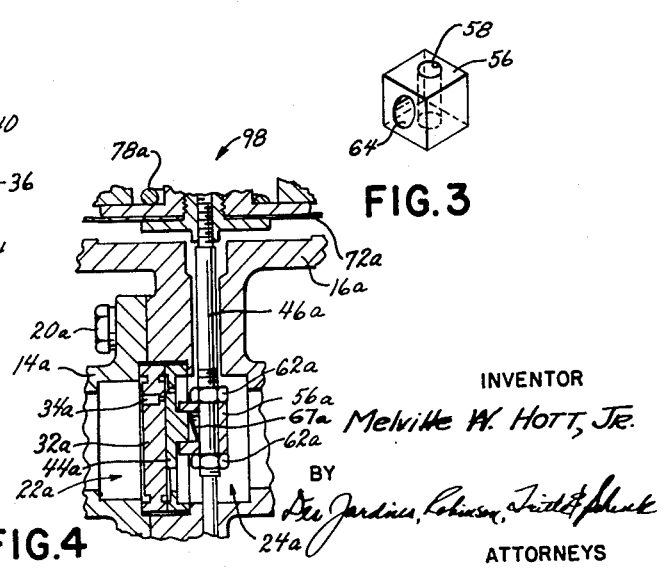
FIGURE 4 is a fragmentary view similar to FIGURE 1 and illustrates another valve construction of this invention.

In particular, another valve construction 98 of this invention is illustrated in FIGURE 4 and is formed substantially identical to the valve construction 10 whereby like parts thereof are indicated by like reference numerals followed by the reference letter "a."

The valve construction 98 is substantially identical to the valve construction 10 except that the fixed valve member 32a thereof has the openings 34a thereof disposed at the upper end thereof rather than at the lower end as in the valve construction 10.

In this manner, the port 22a of the valve construction 98 is adapted to be interconnected to a fluid pressure source having a pressure value greater than the pressure value of the fluid pressure source interconnected to the port 24a thereof.

Thus, as long as the pressure value of the pressure fluid in the port 24a remains above a predetermined pressure value, the force of the pressure fluid in the port 24a acts against the diaphragm 72a to push the same vertically upwardly in opposition to the force of the spring 78a to hold the movable valve member 44a in a position to completely close the openings 34a in the fixed valve member 32a.

However, should the pressure value of the pressure fluid in the port 24a fall below a predetermined pressure value, the force of the compression spring 78a pushes the diaphragm 72a downwardly whereby the movable rod 46a moves the movable valve member 44a downwardly so that the openings 34a in the fixed valve member 32a are uncovered to interconnect the pressure source of the port 22a to the port 24a. In this manner, the pressure value of the pressure fluid in the port 24a is increased by the greater fluid pressure being supplied thereto through the ports 34a. When the pressure value of the pressure fluid in the port 24a again reaches the desired predetermined pressure value, the force of the pressure fluid in the port 24a acts against the diaphragm 72a in opposition to the force of the spring 78a to raise the movable valve member 44a upwardly to again cover the port openings 34a in the fixed valve member 32a.

Therefore, it can be seen that the valve construction 98 illustrated in FIGURE 4 is readily adapted to maintain a pressure value of the pressure fluid in the port 24a above a predetermined pressure value.

The only difference therefore between the valve constructions 10 and 98 is that the fixed valve member 32 of the valve construction 10 is rotated 180 degrees from the position illustrated in FIGURE 1 to the position illustrated in FIGURE 4. Also in the embodiment illustrated by FIGURE 4, it is desirable to employ spring 67a to insure that member 44a is urged against member 32a since the pressure in port 22a is greater than the pressure in port 24a.

Therefore, it can be seen that the valve constructions of this invention are readily adapted to be utilized for a variety of uses in substantially the same manner by only varying the position of the fixed valve member thereof.

It will be particularly noted that the movable member 44 is on the same side of the fixed member 32 as the stem 46. This construction eliminates the expense of a costly machining operation which was inherent with prior valves of this type, wherein the movable member was located on one side of the fixed member and the stem on the other side of the fixed member. In such prior construction the movable member and stem were connected by a pin which extended through a pin slot provided in the fixed member. The pin and pin slot required milling in order to reduce the leakage area through the fixed member.

The present construction completely eliminated the necessity of the pin slot and the costly machining operation mentioned above. It further completely eliminates damage to the parts as previously occurred when the pin exceeded its normal movement and abutted the ends of the pin slot, thereby damaging the surrounding parts.

Heretofore both the fixed valve members 32, 32a and the movable valve members 44, 44a have ben constructed of a metal and during use such metallic members were subjected to galling and seizing particularly if the fluid passing through the valve contained foreign particles, however small. In view of the fluid pressure tending to force the two members together it is believed that there ocured a welding of the asperities, that is the small pinnacles present in such metallic members tended to weld the members together and thereby produce a relatively high coefficient of friction between the two members. In order to overcome such frictional forces, pressure responsive means capable of producing substantially high forces had to be utilized and this increased the weight and cost of the valve. An additional complication which resulted from the high frictional forces was erratic operation of the valves. This was true even though the metallic members were carefully machined and the materials carefully selected.

An amazing and unexpected result was found to occur when one or both of the members 32 or 44 were constructed of a suitable graphite material such as carbon or pyrolytic graphite. An extremely beneficial result was the reduction in the coefficient of friction which materially reduced the required operating force (approximately 3–4 to 1 reduction).

In addition to vastly improved ease of operation it was found that such material when thus utilized would not gall, seize or wear in the sense of two metals under similar conditions.

A suitable carbon graphite material would be one having the following characteristics:

(a) Hardness _____ 0.5–1 (Mohs' scale).
(b) Density _____ 1.6–2.0 gm./cm.$^3$.
(c) Transverse breaking strength _____ 13,000 p.s.i. (average).
(d) Compressive strength __ 37,000 p.s.i. (average).

A suitable pyrolytic graphite material would be one having the following characteristics:

(a) Hardness _____ 1–4.5 (Mohs' scale).
(b) Density _____ 2.5–2.22 gm./cm.$^3$.
(c) Tensile strength _____ 15–20,000 p.s.i.

While the above represents characteristics of graphite materials it is not intended that the present invention should be limited to said examples as such materials are susceptible of variations.

It was further found that the graphite materials resisted wear and erosion due to high velocities of the fluids in the valve to a much better degree than metallic materials under the same conditions.

Furthermore it was found that movable valve members so constructed were sufficiently resilient to deflect with the fixed valve member, if required to do so.

While particular embodiments of the invention have been illustrated and described, it will be obvious to those skilled in the art that various changes and modifications can be made without departing from the invention; and it is intended to cover in the appended claims all such changes and modifications that fall within the true spirit and scope of the invention.

Having thus described the invention, what I claim as new and useful and desire to secure by United States Letters Patent, is:

1. A valve construction comprising a housing having a first port interconnected to a second port, a fixed valve member disposed in said housing between said ports and having an opening passing therethrough to interconnect said ports together, a separate guide member disposed in said housing and abutting one side of said fixed valve member, said guide member having an aperture passing therethrough and interconnected to said opening, a movable valve member disposed in said aperture of said guide member and abutting said one side of said fixed valve member, and means operatively interconnected to said movable valve member to move said movable valve member between positions of covering said opening in said fixed valve member and uncovering said opening.

2. A valve construction as set forth in claim 1 wherein said aperture in said guide member is substantially rectangular.

3. A valve construction as set forth in claim 1 wherein said guide member has a circular outer periphery.

4. A valve construction as set forth in claim 1 wherein said movable valve member is constructed of a graphite material.

5. A valve construction comprising a housing having a first port interconnected to a second port, a fixed valve member disposed in said housing between said ports and having an opening passing therethrough to interconnect said ports together, a separate guide member disposed in said housing and abutting one side of said fixed valve member, said guide member having an aperture passing therethrough and interconnected to said opening, a movable valve member disposed in said aperture of said guide member and abutting said one side of said fixed valve member, said movable valve member being movable between positions covering and uncovering said opening in said fixed valve member, a movable rod carried by said housing, and means interconnecting said rod to said movable valve member.

6. A valve construction as set forth in claim 5 wherein said means interconnecting said rod to said movable valve member comprises a block having a first bore passing therethrough and receiving said rod, said block having a second bore disposed transverse to said first bore, and said movable valve member having a projection received in said second bore of said block.

7. A valve construction in accordance with claim 5 and including means biasing the movable member to the fixed member.

8. A valve construction as set forth in claim 5 wherein said movable valve member is constructed of a graphite material.

9. A valve construction in accordance with claim 7 wherein said biasing means includes a spring disposed between the movable member and said interconnecting means.

10. A combination as set forth in claim 7 wherein said first port is interconnected to a source of pressure having a smaller pressure value than said source of pressure interconnected to said second port.

11. A combination as set forth in claim 7 wherein said first port is interconnected to a source of pressure having a greater pressure value than said source of pressure interconnected to said second port.

12. A combination as set forth in claim 7 wherein a diaphragm is interconnected to said movable valve member and has one side thereof responsive to said pressure in said second port, and wherein spring means acts against the other side of said diaphragm to normally hold said movable valve member in a position to cover said opening in said fixed valve member.

13. In combination, a housing having a first port interconnected to a second port, said second port being interconnected to a source of pressure, a fixed valve member disposed in said housing between said ports and having an opening passing therethrough to interconnect said ports together, a separate guide member disposed in said housing and abutting one side of said fixed valve member, said guide member having an aperture passing therethrough and interconnected to said opening, a movable valve member disposed in said aperture of said guide member and abutting said one side of said fixed valve member, and means operatively interconnected to said movable valve member to move said movable valve member between positions of covering said opening in said fixed valve member and uncovering said opening, said means being responsive to the pressure in said second port.

14. A combination as set forth in claim 13 wherein said movable valve member is constructed of a non-metallic material.

15. A combination as set forth in claim 13 wherein said movable valve member is constructed of a graphite material.

References Cited in the file of this patent

UNITED STATES PATENTS

| | | |
|---|---|---|
| 1,462,466 | Whitaker | July 17, 1923 |
| 1,787,628 | Jones | Jan. 6, 1931 |
| 1,877,700 | Silvene | Sept. 13, 1932 |
| 1,938,943 | Terry | Dec. 12, 1933 |
| 2,493,880 | Korfmann | Jan. 10, 1950 |
| 2,827,260 | Jordon | Mar. 18, 1958 |